United States Patent [19]

Blair

[11] Patent Number: 4,826,611
[45] Date of Patent: * May 2, 1989

[54] WELL DRILLING AND COMPLETION COMPOSITION

[75] Inventor: Boyton T. Blair, Slidell, La.

[73] Assignee: Engineering & Colloid, Ltd., Slidell, La.

[*] Notice: The portion of the term of this patent subsequent to Dec. 29, 2004 has been disclaimed.

[21] Appl. No.: 107,949

[22] Filed: Oct. 13, 1987

Related U.S. Application Data

[63] Continuation-in-part of Ser. No. 806,437, Dec. 9, 1985, Pat. No. 4,715,971.

[51] Int. Cl.$^4$ .................................................. C09K 7/02
[52] U.S. Cl. ................... 252/8.51; 252/8.514; 252/8.551
[58] Field of Search .................. 252/8.51, 8.514, 8.551

[56] References Cited

U.S. PATENT DOCUMENTS

| | | | |
|---|---|---|---|
| 2,552,795 | 5/1951 | Fischer et al. | 252/8.551 |
| 2,650,905 | 9/1953 | Fordyce et al. | 252/8.551 |
| 2,718,497 | 9/1955 | Oldham et al. | 252/8.551 |
| 3,079,335 | 2/1913 | Clem et al. | 252/8.551 |
| 3,318,396 | 5/1967 | Tailleur | 252/8.514 X |
| 4,033,893 | 7/1977 | Mondshine | 252/8.551 |
| 4,048,077 | 9/1977 | Engelhardt et al. | 252/8.551 |
| 4,268,400 | 5/1981 | Lucas et al. | 252/8.551 |
| 4,507,210 | 3/1985 | Lauzon | 252/8.51 |
| 4,554,307 | 11/1985 | Farrar et al. | 524/425 |
| 4,715,971 | 12/1987 | Blair | 252/8.51 |

FOREIGN PATENT DOCUMENTS

2090888 9/1982 United Kingdom .

*Primary Examiner*—Herbert B. Guynn
*Attorney, Agent, or Firm*—John W. Carpenter

[57] ABSTRACT

A well drilling and completion fluid having a potassium salt of a copolymer of (a) acrylic acid, or an α-substituted acrylic acid and (b) acrylate ester having the general formula $CH_2=CH-COOR$ where R is an alkyl or hydroxalkyl having 1 to 4 carbon atoms and substituted R groups; and an accelerator catalyst composed of water, KOH, lignite, sulfonated polystyrene, and, optionally, a vinylsulfonate/vinylamide polymer.

9 Claims, No Drawings

WELL DRILLING AND COMPLETION COMPOSITION

This is a continuation-in-part of application Ser. No. 806,437, filed Dec. 9, 1985, now U.S. Pat. No. 4,715,971.

BACKGROUND OF THE INVENTION

1. Field of the Invention

The present invention relates to a new and improved drilling fluid composition. More specifically, the present invention provides a new and improved well drilling and completion composition which when added to drilling mud prevents flocculation of drilled solids while simultaneously controls overall fluid rheology.

2. Description of the Prior Art

The value of potassium electrolytes for the inhibition of bentonite swelling in drilling fluids has been recognized since the late 1940's. It has been pointed out that potassium ions have a strengthening effect upon clay formations and that the potassium ions fit into the crystal structure of clay surfaces in such a manner as to not dissociate and create dispersive action among clay particles. The effectiveness of the potassium ion in limiting the peptization of clays has been shown and the effectiveness of potassium in combating the problems encountered while drilling through sensitive shale formations has been presented.

Although both potassium and sodium are alkali of similar atomic structure, their properties in colloidal systems have long been noted to be strikingly dissimilar. The majority of ions have an effective diameter much larger in water because of hydration and polorization effects; however, the monatonic ions of potassium, rubidium, and cesium are non-hydrated in water solution.

The potassium ion, the largest of the common ions in crystalline silicates does not change its volume when placed in solution and is therefore only one-third as voluminous as the sodium ion in solution. Inasmuch as adsorption is in inverse ratio to a power of the volume, the potassium ion is much more strongly absorbed on clays than is sodium. The sodium character of sea water in comparison with the potassium character of sedimentary rocks is due to this strong preferential adsorption of potassium by clays.

It is well known that under metamorphic conditions of temperature and pressure montmorillonite (bentonite) will be converted to illite if potassium is present. It has been shown, however, that this diagenetic modification can be initiated during the flocculation and settling of bentonitic sediments in sea water.

It is well documented in the literature that the potassium ion, because of its dimensional characteristics in solution will fit into the holes in the oxygen not of silicate surfaces. Because of this, it is attracted strongly to crystal lattice structure of clay surfaces and unlike the hydrated sodium ion, it is not free to dissociate and form a dispersive electrokinetic double layer. Adsorbed potassium ions thus act to inhibit the spontaneous dispersion of clays into water. It has been shown that the potassium ion is two (2) or three (3) times more effective in flocculating clay suspensions than it is the sodium ion.

The accumulation of evidence, including the fact that potassium ions are preferentially adsorbed by clays, even in the presence of sodium ions, establishes the potassium ion as a highly desirable cation to be employed in drilling fluid design to stabilize the bore hole.

It has been established that 3% to 5% of KCl solution (10 to 17 lbs./bbl.) must be maintained to control hydration and osmotic action in sensitive shale formation. A 15% KCl solution (50 lbs./bbl.) will inhibit the chemical dispersion of plastic bentonite masses and will convert calcium and sodium clays to potassium clays provided that a sufficient amount of time is allowed. However, the use of KCl is corrosive, costly and generally not reliably effective in normal drilling operations because there is not enough time for the conversion of the calcium and sodium clay to potassium clays.

U.S. Pat. No. 4,000,076 by Bondine, et al, teaches a phosphate added to a drilling mud containing potassium chloride to reduce corrosiveness. U.S. Pat. Nos. 3,079,334 and 3,079,335 to Clem discloses the use of water-soluble leonardite in combination with a water-soluble polyphosphate to provide drilling fluids of relatively low gel strength and viscosity which are effective in preventing hydration and swelling of native clays. Cates in U.S. Pat. No. 4,404,108 teaches reacting lignite and tannin together with sodium sulfite, paraformaldehyde and sodium hydroxide in water to give a reaction product suitable for use as a drilling fluid additive. U.S. Pat. No. 3,766,229 to Turner, et al, presents a dispersing agent and/or fluid loss control agent for drilling fluids obtained by employing sulfonated lignite and/or sulfonated humic acid wherein the cation for these salts are selected from alkali metals, alkaline earth metals and various elements having atomic numbers 57 through 71. U.S. Pat. No. 4,033,893 by Mondshine discloses a drilling fluid consisting essentially of a suspension of clay, lime, and a lignitic material in an aqueous phase.

What is needed and what has been invented is an improved, sodium free drilling fluid which prevents flocculation of drilled solids while simultaneously controlling overall fluid rheology. The standards of the mud systems for the past 30 years have been the dispersed mud systems comprising primarily lignosulfonates or lignite with a heavy metal, such as chrome or bichromates, to give these systems stability in controlling mud rheology. These systems have limitations of temperatures between 285° F. and 300° F. in controlling filtration and rheology simultaneously. In chemistry, this would be described as an electrochemical system.

The drilling fluid system of this invention is a deflocculating system, sodium free, allowing to control mud rheology and filtration simultaneously. Chemically, the improved system of this invention may be classed as a chemisorption process of a non-encapsulating polymer which functions as an uncoiled polymer and allows control of rheology and filtration without regard to calcium or chlorides levels or temperatures up to 500° F. as long as the ingredients of the system are induced in accordance to the concentration of calcium and chloride or to the degree of temperature encountered while drilling the borehole to accommodate desired rheology relative to mud density and/or operators' demands and for filtration control desired.

SUMMARY OF THE INVENTION

The present invention accomplishes its desired objects by broadly providing a well drilling and completion composition having a potassium salt of a copolymer of a first compound with a formula $CH_2=CR_1-COOH$ wherein $R_1$ is selected from the group consisting of H, and an alkyl having 1 to 4 carbon atoms, and a second compound having a formula $CH_2=CH-COOR_2$ wherein $R_2$ is selected from the group consisting of an alkyl radical and a hydroxyalkyl wherein the alkyl and hydroxyalkyl each have 1 to 4 carbon atoms. The well drilling and completion composition of this invention also has an accelerator catalyst which includes water, KOH, lignite, sulfonated polystyrene, and a vinylsulfonate/vinylamide copolymer if the temperature of the system is above 285° F.

Therefore, it is an object of the present invention to provide an improved well drilling and completion composition.

It is another object of this invention to provide an improved well drilling and completion composition which is stable regardless of any environmental contaminants.

Still other objects will be apparent to those skilled in the art from the following description of this invention.

DETAILED DESCRIPTION OF THE INVENTION

In accordance with the present invention, a well drilling and completion composition, which has unexpected control of rheology and fluid loss control characteristics when employed to a water base drilling fluid, is obtained by mixing a homopolymer or copolymers of hydroxyalkylacrylates with monomers such as acrylic acid, methoacrylic acid, other alkyl acrylic acids, their esters and salts, and an accelerator catalyst. Suitable comonomers for alliance with the monomers include, but are not limited to, vinyl acetate, acrylonitrile, methylacrylate, and the like.

In a preferred embodiment of the present invention, for each barrel of water base drilling fluid, the composition comprises between about 0.10 and about 10 quarts of the accelerator catalyst, and between about 0.10 and about 6 lbs. of a potassium salt of a copolymer having a monomer with the formula $CH_2 = CR_1 - COOH$ wherein $R_1$ is selected from the group consisting of H, and alkyl(s) having 1 to 4 carbon atoms, and a comonomer having the formula $CH_2 = CH - COOR_2$ wherein $R_2$ is selected from the group consisting of alkyl and hydroxylalkyl, each having 1 to 4 carbon atoms. More preferably, the monomer is acrylic acid wherein $R_1$ is H, and the comonomer is hydroxypropylacrylate wherein $R_2$ is hydroxypropyl.

The monomer and comonomer have a molar ratio of monomer to comonomer of between about 1:1 to about 3:1. In the preferred embodiment of the invention where the monomer is acrylic acid and the comonomer is hydroxypropylacrylate, the preferred molar ratio of the monomer (acrylic acid) to comonomer (hydroxypropylacrylate) is approximately 2:1.

The copolymer of this invention has a weight average molecular weight of less than about 20,000, and more preferably between about 1,000 to about 8,000. In the use of acrylic acid and hydroxpropylacrylate as the monomer and comonomer, respectively, the weight average molecular weight is preferably 3,000.

The accelerator catalyst of this invention comprises water, lignite, KOH, sulfonated polystyrene, and, if the drilling fluid system is at a temperature between 285° F. to about 500° F., a vinylsulfonate/vinylamide polymer. In a preferred embodiment of the invention, the accelerator catalyst having water comprises per each bbl. of water: at least 2 to 80 lbs. of KOH (preferably 40); 10 to 50 lbs. of lignite; at least 5 to 25 lbs. of $K_2O$ (preferably 10 to 16 lbs.); at least 5 to 15 lbs. KCl (preferably 5 lbs. KCl); and 1 to 10 lbs. of sulfonated polystyrene (preferably 5 lbs.). If the temperature of the drilling fluid system is between 285° F. to about 500° F., the accelerator catalyst additionally comprises 1 to 10 lbs. of the vinylsulfonate/vinylamide polymer (preferably 5 lbs.) The KOH, lignite, $K_2O$, KCl and the polystyrene are admixed proportionately into a predetermined amount of water. The vinylsulfonate/vinylamide polymer may be admixed with the other constituents into the accelerator catalyst water, or, optionally, the vinylsulfonate/vinylamide polymer may be added into the drilling fluid system only after the drilling fluid system has reached a temperature of 285° F. or above. The catalyst mixture has to be heated and stirred for a predetermined time period in order to produce the accelerator catalyst of this invention. I have discovered that after the exothermic reaction between the KOH, lignite and the other product(s), the mixture should be heated to at least 120° F. (preferably 190°–212° F.) while simultaneously stirring for at least 30 minutes (preferably 1.5 to 2 hours). Heating and stirring may be conducted at atmospheric conditions with a heat probe or the like. The mixture, after being heated and stirred, is subsequently centrifuged to remove any solids, and packaged as a liquid. The resulting compound, from being heated and stirred for a certain time period, acts as a catalyst with any polymeric drilling fluid additive (preferably the potassium polyacrylate polymer) and as a very slow degenerating compound. The resulting catalytic compound improves the release in the free non-bonded state the potassium ion, which is available for the negative ionic functions of the borehole clays.

The lignite employed in the catalyst of the present invention may be any lignite or brown coal of a variety of coal intermediate between peat and bituminous coal. The chemical composition and characteristic of lignite have been described in literature, for example Encyclopedia of Chemical Technology, Volume 14, Kirk-Othmer, and the Journal of American Chemical Society, Volume 69 (1947). Lignite has often been refered to "brown coal", or "wood coal" since the texture of the original wood is distinct.

The Encyclopedia of Chemical Technology (Vol. 14) by Kirk-Othmer points out that lignite is distinguishable from lignin. Lignosulfonate materials are prepared from lignin and does not render the improved, unexpected results obtained by this invention through the use of lignite in combination with KOH, the sulfonated polystyrene, and the vinylsulfonate/vinylamide polymer at a temperature above 285° F. Lignin is a complex noncarbohydrate constituent obtained from wood, straw, corn stocks, or the like, and is substantially different chemically from the coal matter, lignite.

The lignitic material of this invention preferably contains appreciable quantities of humic acids. The richest common source of humic acid is the coal known as leonardite, which is a black carbonaceous form of lignite. It is a form of oxidized lignite consisting mainly of humic acid. Natural leonardite, which normally contains 20% to 50% moisture can be used or it can be ground in an impact mill and dried to less than 20% moisture. Leonardite in its natural form is insoluble in water but is soluble in alkaline solutions. Water-soluble salts can be readily produced by treating leonardite with sufficient aqueous alkali to neutralize the acid radicals and then evaporating the solution to dryness. Soluble forms of leonardite can be also produced by dissolving leonardite in aqueous alkaline solutions, such as solutions of the KOH and water.

The lignitic material of this invention preferably contains about 30 wt. % on a dry basis of humic acid. More preferably, the lignitic material employed in the present invention contains from about 50 to about 65 wt. % on a dry basis of humic acid. Because of the variable nature of lignite, a precise molecular structure of lignite is unknown. Therefore, the molecular structure of the reaction product obtained by the reaction in water of lignite, KOH, the sulfonated polystyrene, and the vinylsulfonate/vinylamide polymer above a drilling fluid temperature of 285° F., is unknown. But lignite (and humic) are well known to skilled artisans, and is available commercially.

As was previously mentioned, if the temperature of the drilling fluid system is about 285° F. or above, the accelerator catalyst additionally comprises the vinylsulfonate/vinylamide polymer. Optionally, and as a matter of economics, the vinylsulfonate/vinylamide polymer may be added to the accelerator catalyst (or directly into the drilling fluid system) only after the well has been drilled to a depth where the drilling fluid system at the bottom of the well is at a temperature of about 285° F. or above. It should be understood that the vinylsulfonated/vinylamide polymer may be added to the accelerator catalyst or the drilling fluid system below 285° F. without detrimentally affecting the other constituents.

The vinylsulfonate/vinylamide polymer is preferably a copolymer whose monomers respectively have the general formulas:

(a) $CH_2=CHSO_2OH$;

and (b) $CH_2=CHCONH_2$

The vinylsulfonate/vinylamide polymer has an average molecular weight of between 500,000 to about 4 million. The molar ratio of the vinylsulfonate monomer to the vinylamide monomer within the copolymer is between about 10:1 to about 1:10.

The accelerator catalyst of this invention additionally comprises a polystyrene salt which may be any non-sodium polystyrene salt but is preferably a potassium salt of a polymer of a styrene-containing acid. More preferably, the polystyrene salt may be the potassium salt of sulfonated polystyrene, or the potassium salt of a polystyrene carboxylic acid.

In a preferred embodiment of the present invention, the polystyrene salt in the accelerator catalyst comprises a sulfonated homopolymer (polystyrene) whose monomer has the general formula

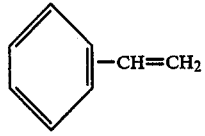

having an average molecular weight of between 1 to 12 million, preferably 6 million, with the degree of sulfonation being theoretically 100%.

The sulfonation reaction for polystyrene of this invention may be conducted in an alkaline reaction medium which can be any conventional medium known in the art and which is substantially inert to the sulfonation reaction. Water is a commonly used medium although nonaqueous media can be employed where the lignite contains sufficient absorbed water for the reaction.

The sulfonate radical donors for the polystyrene of this invention include both sulfites and bisulfites of the alkali metals and alkaline earth metals as defined hereinabove, as well as sulfurous acid and sulfur dioxide. Preferred donors include, without limitation, the sulfites and metabisulfites of potassium, calcium, magnesium, lithium, and ammonium. Sulfurous acid can also be added to the alkaline reaction system and similar results are achieved by the addition of sulfur dioxide gas to the alkaline reaction medium. Other common sulfonating agents may include, but are not limited to, concentrated sulfuric acid, fuming sulfuric acid, alkali disulfates, sulfur trioxide, pyrosulfates, chlorosulfonic acid and a mixture of manganese dioxide and sulfurous acid.

The amount of sulfonate radical donor or donors will also vary widely depending upon the degree of sulfonation desired. Sufficient sulfonate donor should be added to effectively form a stable sulfonated product. Generally, at least about 5 parts, preferably from about 5 to about 50 parts, of sulfonate radical donor or donors can be employed based upon the total weight of the styrene to be reacted.

The varying degrees of sulfonation obtained depend in part on the well known ranges of conditions involved in the different methods of sulfonation. The chemical formula for the sulfonic acid group is—$SO_3H$, in which the sulfur atom is combined directly with the carbon atom in the styrene. The sulfonate sulfur (sulfur combined directly with carbon) is quite stable and not readily removed from the styrene. The extent of sulfonation will vary widely but will generally be that which promotes the fluid loss control characteristics of the polystyrene.

The sulfonation reaction can be carried out at substantially any temperature including ambient and subambient, but proceeds best at elevated temperatures, preferably from about 175° to about 480° F. for time periods of from about 2 to about 8 hours. The reaction pressure can be ambient or subambient but again the reaction proceeds better at elevated pressures such as from about 50 to about 800 p.s.i.g.

The drilling fluids to which the compositions of this invention can be added may contain an effective viscosifying amount of conventional clays. Generally, from about 1 about 20 weight percent clay can be employed but this will vary widely depending upon the functional desires for the final drilling fluid and the clays employed. Suitable clays include kaolins (kaolinite, halloysite, dickite, nacrite, and endellite), bentonites (montmorillonite, beidellite, nontronite, hectorite, and saponite), hydrous micas (bravaisite or illite), attapulgite, sepiolite, and the like. This composition may range from 10 to 25 lbs./bbl. for the system, however, the concentration is dependent upon the mud density requirements and to some degree the hole temperature about 425° F.

The drilling fluids can also contain conventional weighting agents in effective weighting amounts, these agents including, for example, barium sulfate, barium carbonate, iron oxide, strontium sulfate (celestite), mixtures thereof, and the like. Weighting agents can be employed to give drilling fluids having a final density of up to about 22 pounds per U.S. gallon. More preferably, barite is the primary weight agent and is induced to the mud composition in varying amounts to increase the mud density from 8.5 lbs./gal. to 19.2 lbs./gal.

Other conventional additives such as emulsifiers, fermentation control agents, and the like may be employed if desired and so long as they are substantially inert to the compositions of this invention.

The liquid base for the drilling fluids of this invention is substantially aqueous and may include a minor amount of an organic material (e.g., a mineral or a hydrocarbonaceous material). The aqueous bases include fresh water (sodium chloride content of less than 1 weight percent and/or calcium content of less than 120 parts per million) and saline water which includes both brackish and sea water (sodium chloride content greater than 1 weight percent and/or calcium content greater than 120 parts per million). The compositions of this invention are particularly useful in saline muds in that their dispersing and fluid loss control functions are not as adversely affected by the salts contamination as other known additives such as the chrome lignosulfonates.

All the compositions of this invention can be incorporated in the drilling fluids by simply mixing under ambient conditions of temperature and pressure for periods sufficient to give a substantially homogeneous mixture. The amount of composition added will vary widely depending upon the composition of the drilling fluid itself, the composition of the composition or compositions themselves, the particular conditions in the particular well to which the drilling fluid is to be added, and on and on. Generally, an amount of composition effective for at least one of dispersing and fluid loss control is suitable. As a nonlimiting example, the drilling fluid can contain amounts of at least one composition of this invention of from about 0.1 to about 15 weight percent based on the total weight of the drilling fluid.

The drilling fluids containing the compositions of this invention can be employed in any manner in which drilling fluids are conventionally employed at present. Thus, the drilling fluids can be employed in the drilling in or completing of a well, or the working over of an already drilled well. The drilling fluids containing the compositions of this invention can also be employed as packer fluids, and the like, all of which uses are intended in this invention to fall within the scope of the term "drilling fluid".

My invention will be illustrated by the following set forth examples which are given by way of illustration and not by any limitations. All parameters such as concentrations, mixing proportions, temperatures, pressures, rates, compounds, etc., submitted in these examples are not to be construed to unduly limit the scope of my improved process.

EXAMPLES

EXAMPLE I

Per each barrel of fresh water (or seawater) the following additives were mixed:
(1) 0.25 lbs. of a potassium salt of the copolymer of acrylic acid and hydroxypropylacrylate (in a 2:1 molar ratio, respectively) with an average molecular weight of 3,000.
(2) 15 lbs. of attaplugite (or sepiolite).
(3) 7.5 lbs. of bentonite.
(4) 8.0 lbs. of starch.
(5) 1 qt. of the accelerator catalyst having water, lignite, KOH, and sulfonated polystyrene having an average molecular weight of about 6 million with the degree of sulfonation being theoretically 100%.

The accelerator catalyst was prepared by adding to a barrel of water: 40 lbs. of KOH, 35 lbs. of lignite and 5 lbs. of sulfonated polystyrene. The KOH, lignite and sulfonated polystyrene were admixed in the water, heated at 200° F., and stirred for about 1.5 hours.

The drilling fluid has the following properties:

| A.V. cps | 12–13 |
| PV | 8–9 |
| YP lbs./100 ft$^2$ | 2–4 |
| Gels | 1/4 |
| pH | 9.5–13.5 |
| API Fluid Loss | 5–8 |
| Potassium | 0.2–0.5% |

Hot rolled 16 hrs.—180° F.

For the drilling fluid having a Temp.: to 285° F. The addition of a commercial Hydroxethylicellulose may be added. For filtration control below 10cc API, use increments of 0.25 to 1.0 lbs. per bbl.

A well was drilled and it was found that those were excellent rheology and filtration control. The diameter of the borehole of the drilled well remained essentially constant throughout the entire length of the drilled hole.

EXAMPLE II

"Example I" is repeated except that ingredients of the accelerator catalyst are not heated or stirred in the preparation of the same and generally at times unstable rheology phenomenon is observed.

EXAMPLE III

"Example I" is repeated except that the accelerator catalyst is omitted and unstable rheology phenomenon is observed.

EXAMPLE IV

"Example I" is repeated except that the sulfonated polystyrene is omitted from the accelerator catalyst and unstable filtration or varying diameter drill hole occurs.

EXAMPLE V

Per each barrel of salt water (or fresh water):
(1) 1–5 lbs. of a potassium salt of the copolymer of acrylic acid and hydroxypropylacrylate (in a 2:1 molar ratio, respectively) with an average molecular weight of 3,000.
(2) 10 to 15 lbs. of attaplugite (or sepeolite).
(3) 2 to 6 quarts of accelerator catalyst having water, lignite, KOH, sulfonated polystyrene having an average molecular weight of about 6 million with the degree of sulfonation being theoretically 100%, and a copolymer in a 1:1 molar ratio and an average molecular weight of about 2 million, of vinylsulfonate and vinylamide.

Percentages of foregoing ingredients dependent upon mud density, temperature and nature for formation drilled.

The accelerator catalyst was prepared by adding to a barrel of water: 40 lbs. of KOH, 35 lbs. of lignite, 5 lbs. of sulfonated polystyrene, and 5 lbs. of vinylsulfonate/-vinylamide.

A well was drilled with the drilling fluid being at a temperature of 285° F.–500° F. and the results of "Example I" were found.

EXAMPLE VI

"Example V" is repeated except that ingredients of the accelerator catalyst are not heated or stirred in the preparation of the same and generally at times unstable rheology phenomenon is observed.

EXAMPLE VII

"Example V" is repeated except that the potassium salt of the copolymer is omitted and no rheology control is obtained.

EXAMPLE VIII

"Example V" is repeated except that the vinylsulfonate/vinylamide copolymer is omitted from the catalyst and loss of control of filtration and a varying diameter drill hole occurs.

Thus, by the practice of this invention, there is provided a composition for a drilling fluid which is stable regardless of any environmental contamination. The advantages of the present composition include the ability to reduce the migration of water to the shale formation, to refrain from increasing the viscosity of the drilling fluid, to improve overall fluid rheology, and to provide shale inhibition. The composition has the required ability to bond to the edges of clay particles in a clay dispersion and to satisfy the electrical charges, and thus disperse the particle. The bonding, coating and dispersing of the clay particles are such that the fluid to which the present product is added, provides a thin impermeable wall cake that effectively decreases water loss and prevents the hydration of permeable shale formations. The composition permits this to be done in a way which is ecologically acceptable throughout the oil and gas well drilling industry.

While the present invention has been described herein with reference to particular embodiments thereof, and specific examples a latitude of modification, various changes and substitutions are intended in the foregoing disclosure, and in some instances some features of the invention will be employed without a corresponding use of other features without departing from the scope of the invention as set forth.

I claim:

1. A water base well drilling and completion composition comprising per each barrel of water base well drilling and completion composition:
    (a) from about 0.10 lbs. to about 6.0 lbs. of a potassium salt of a copolymer of a first compound having the formula

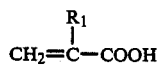

wherein $R_1$ is selected from the group consisting of H and an alkyl having 1 to 4 carbon atoms, and a second compound having the formula $CH_2=CH-COO-R_2$ wherein $R_2$ is selected from the group consisting of an alkyl radical and a hydroxyalkyl wherein said alkyl and hydroxyalkyl each have 1 to 4 carbon atoms, said first compound and said second compound are combined in a molar ratio of from about 1:1 to about 3:1 of the first compound to the second compound, and said copolymer has a weight average molecular weight of less than about 20,000; and
    (b) from about 0.10 quarts to about 10.0 quarts of an accelerator catalyst having water, from about 2 lbs. to about 80 lbs. of KOH per each bbl. of water, from about 10 lbs. to about 50 lbs. of lignite per each bbl. of water, at least 5 to 25 lbs. of $K_2O$ per each bbl. of water; at least 5 to 15 lbs. KCl per each bbl. of water; and from about 1.0 lbs. to about 10 lbs. of sulfonated polystyrene per each bbl. of water and wherein said sulfonated polystyrene has an average molecular weight of from about 1 to about 12 million, and said accelerator catalyst having been prepared by heating the mixture of water, lignite, KOH and sulfonated polystyrene to a temperature of at least 120° F. while simultaneously stirring for at least 30 minutes.

2. A water base well drilling and completion composition comprising per each barrel of water base well drilling and completion composition:
    (a) from about 0.10 lbs. to about 6.0 lbs. of a potassium salt of a copolymer of a first compound having the formula

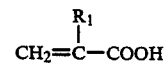

wherein $R_1$ is selected from the group consisting of H and an alkyl having 1 to 4 carbon atoms, and a second compound having the formula $CH_2=CH-COO-R_2$ wherein $R_2$ is selected from the group consisting of an alkyl radical and a hydroxyalkyl wherein said alkyl and hydroxyalkyl each have 1 to 4 carbon atoms, said first compound and said second compound are combined in a molar ratio of from about 1:1 to about 3:1 of the first compound to the second compound and said copolymer has a weight average molecular weight of from about 1,000 to about 8,000; and
    (b) from about 0.10 quarts to about 10.0 quarts of an accelerator catalyst having water, from about 2 lbs. to about 80 lbs. of KOH per each bbl. of water, from about 10 lbs. to about 50 lbs. of lignite per each bbl. of water, at least 5 to 25 lbs. of $K_2O$ per each bbl. of water; at least 5 to 15 lbs. KCl per each bbl. of water; and from about 1.0 lbs. to about 10 lbs. of sulfonated polystyrene per each bbl. of water and wherein said sulfonated polystyrene has an average molecular weight of from about 1 to about 12 million, and said accelerator catalyst having been prepared by heating the mixture of water, lignite, KOH and sulfonated polystyrene to a temperature of at least 120° F. while simultaneously stirring for at least 30 minutes.

3. The well drilling and completion composition of claim 2 wherein said $R_1$ is H and $R_2$ is hydroxypropyl.

4. The well drilling and completion composition of claim 3 wherein said copolymer has a weight average molecular weight of about 3,000, and said molar ratio of the first compound to the second compound is about 2:1.

5. The well drilling and completion composition of claim 2 wherein said sulfonated polystyrene comprises a sulfonated homopolymer whose monomer has the general formula

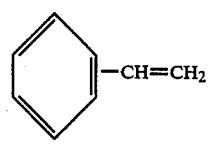

and wherein the degree of sulfonation is theoretically about 100%.

6. The well drilling and completion composition of claim 2 additionally comprising a weighting agent and a viscosity increasing agent.

7. The well drilling and completion composition of claim 2 additionally comprising a copolymer of vinylsulfonate and vinylamide whose monomers respectively have the general formulas $CH_2=CHSO_2OH$ and $CH_2=CHCONH_2$, and said copolymer has an average molecular weight of between 500,000 to about 4 million.

8. The well drilling and completion composition of claim 7 wherein the molar ratio of the vinylsulfonate monomer to the vinlyamide monomer is between about 10:1 to about 1:10.

9. The well drilling and completion composition of claim 5 additionally comprising a weighting agent and a viscosity increasing agent.

* * * * *